US007531158B2

(12) United States Patent
Lee

(10) Patent No.: US 7,531,158 B2

(45) Date of Patent: May 12, 2009

(54) VAPOR PHASE SYNTHESIS OF DOUBLE-WALLED CARBON NANOTUBES

(76) Inventor: Cheol Jin Lee, 304-1004 Hyundai 3cha Apt., Nawoon2-dong, Gunsan-city, Jeollabuk-do (KR) 573-352

( * ) Notice: Subject to any disclaimer, the term of this patent is extended or adjusted under 35 U.S.C. 154(b) by 774 days.

(21) Appl. No.: 10/550,500

(22) PCT Filed: Mar. 17, 2004

(86) PCT No.: PCT/KR2004/000577

§ 371 (c)(1), (2), (4) Date: Sep. 20, 2005

(87) PCT Pub. No.: WO2004/083113

PCT Pub. Date: Sep. 30, 2004

(65) Prior Publication Data

US 2006/0216221 A1 Sep. 28, 2006

(30) Foreign Application Priority Data

Mar. 20, 2003 (KR) ...................... 10-2003-0017616
Mar. 16, 2004 (KR) ...................... 10-2004-0017644

(51) Int. Cl.
*D01C 5/00* (2006.01)

(52) U.S. Cl. ................................ 423/447.3; 423/447.7

(58) Field of Classification Search ............. 423/447.3, 423/447.7

See application file for complete search history.

(56) References Cited

U.S. PATENT DOCUMENTS

2002/0165091 A1 11/2002 Resasco et al. ............. 502/255

FOREIGN PATENT DOCUMENTS

| | | |
|---|---|---|
| EP | 1 061 043 A1 | 12/2000 |
| JP | 2001-020071 | 1/2001 |
| JP | 2002-29718 | 1/2002 |
| JP | 2002526361 | 8/2002 |
| JP | 2002-255519 | 9/2002 |
| JP | 2002-293524 | 10/2002 |
| KR | 1020020023522 | 3/2002 |

OTHER PUBLICATIONS

Kingsuk Mukhopadhyay et al., "Bulk Production of Quasi-Aligned Carbon Nanotube Bundles by the Catalytic Chemical Vapour Deposition (CCVD) Method," Chemical Physics Letters 303, Apr. 2, 1999, pp. 117-124, Elsevier Science B.V.

"Synthesis of High-Purity Carbon Nanotubes Using Zeolite CCVD," 2002, pp. 864-866, vol. 72, No. 9.

Tatsuki Hiraoka et al., "Syntheses of High-Quality Double-Walled Carbon Nanotubes by the Catalytic Chemical Vapor Deposition (CCVD) Method," Abstracts The 23rd Fullerene Nanotubes General Symposium, Jul. 17-19, 2002, p. 146.

Atsuto Okamoto et al., "Synthesis and Characterization of Multi- and Single-Wall Carbon Nanotubes by the Catalytic Vapor Deposition Method," Mol. Cryst. Liq. Cryst., 2002, vol. 387, pp. 317-322, Taylor and Francis.

Li W.Z. et al., "Clean Double-Walled Carbon Nanotubes Synthesized by CVD", Elsevier, Chemical Physics Letters 368, 2003, pp. 299-306.

*Primary Examiner*—Edward M Johnson
(74) *Attorney, Agent, or Firm*—Nixon Peabody LLP

(57) ABSTRACT

A method of massively synthesizing double-walled carbon nanotubes is provided. In the method, catalyst metal particles having a size of a few nanometers are embedded in nano pores of a support material powder. Then, the support material powder embedding the catalyst metal particles is sintered at a temperature of 700-900° C. Then, the support material powder embedding the catalyst metal particles is loaded in a reactor. Thereafter, high purity double-walled carbon nanotubes are formed massively by vaporizing a carbon source solution at a temperature of 700-1100° C. and supplying the vaporized carbon source gas, or by directly supplying a carbon source gas to the reactor.

7 Claims, 4 Drawing Sheets

5 nm 5 nm

VAPOR PHASE SYNTHESIS OF DOUBLE-WALLED CARBON NANOTUBES

CROSS-REFERENCE TO RELATED APPLICATION

This application claims priority based on International Patent Application No. PCT/KR2004/000577, entitled "Massive Synthesis Method of Double-Walled Carbon Nanotubes Using the Vapor Phase" by Cheol Jin Lee, which claims priority of Korean Application Nos. 10-2003-0017616, filed on Mar. 20, 2003 and Korean Application No. 10-2004-0017644, filed on Mar. 16, 2004.

TECHNICAL FIELD

The present invention relates to a method of synthesizing double-walled carbon nanotubes, and more particularly, to a method of massively synthesizing double-walled carbon nanotubes using a vapor phase growth.

BACKGROUND ART

A carbon nanotube is a graphite sheet curled in a cylindrical shape. According to the number of graphite sheets, carbon naotubes are classified into single-walled carbon nanotubes having a single graphite sheet, double-walled carbon nanotubes having double graphite sheets, and multiwalled carbon nanotubes having three or more graphite sheets.

Since the double-walled carbon nanotube has the advantages of both the single-walled carbon and the multiwalled carbon nanotube, its various applications in an electron emission device, an electronic device, a sensor, a high strength composite material and the like are anticipated. To use the double-walled carbon nanotube, it is essentially requested to synthesize a high purity double-walled carbon nanotube inexpensively and massively.

As methods of synthesizing the double-walled carbon nanotube, there are an electric discharge method and a vapor phase synthesis method. When using the electric discharge method, an amorphous carbon material is generated as a by-product in addition to carbon nanotubes. Accordingly, to obtain high purity carbon nanotubes, thermal and chemical filtration is essentially required. Also, it is difficult to massively and inexpensively synthesize carbon nanotubes using the electric discharge method.

Due to the above difficulties, the vapor phase synthesis method is gaining popularity as an alternative to synthesize the high purity carbon nanotube inexpensively and massively. Then, when double-walled carbon nanotubes are synthesized by various vapor phase synthesis methods reported up to now, production yield of the double-walled carbon nanotube is very low, and massive single-walled nanotube and amorphous carbon particles are created together with the double-walled carbon nanotube.

DISCLOSURE OF THE INVENTION

The present invention provides a method of massively synthesizing high purity double-walled carbon nanotubes having a diameter less than a few nanometers by a vapor phase method.

According to an aspect of the present invention, there is provided a method of synthesizing double-walled carbon nanotubes. In the method, catalyst metal particles composed of Fe, Co, Ni, Mo or an alloy of these elements and having a size of 2-5 nm are embedded in nano pores of a support material powder composed of MgO, $Al_2O_3$, zeolite or silica.

Then, the support material powder in which the catalyst metal particles are embedded is sintered. Thereafter, the double-walled carbon nanotubes are formed by supplying a carbon source gas to the catalyst metal particles embedded in the support is material powder and reacting the carbon source gas with the catalyst metal particles.

To embed the catalyst metal particles in the nano pores of the support material powder, a first solution including the catalyst metal particles is made. Then, the first solution is mixed with the support material powder to form a second solution. Moisture included in the second solution is removed. The removing of moisture is performed in a vacuum oven for 15 hours at a temperature of 150° C. Thereafter, the support material powder including the catalyst metal particles is ground to form the support material powder in which the catalyst metal particles are embedded.

The sintering may be performed in air atmosphere for 6-12 hours at a temperature of 700-900° C. The double-walled carbon nanotubes are formed by loading the support material powder embedding the catalyst metal particles in a reactor, which is maintained at a temperature of 700-1100° C., vaporizing a carbon source solution of an evaporator, and supplying the vaporized carbon gas.

According to the present invention, since the catalyst metal particles are embedded in and fixed to nano pores of the support material powder, movement of the catalyst metal particles is suppressed even at high temperature, it becomes possible to massively synthesize double-walled carbon nanotubes having a uniform diameter.

BRIEF DESCRIPTION OF THE DRAWINGS

The above and other features and advantages of the present invention will become more apparent by describing in detail exemplary embodiments thereof with reference to the attached drawings in which.

BEST MODE FOR CARRYING OUT THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 1:
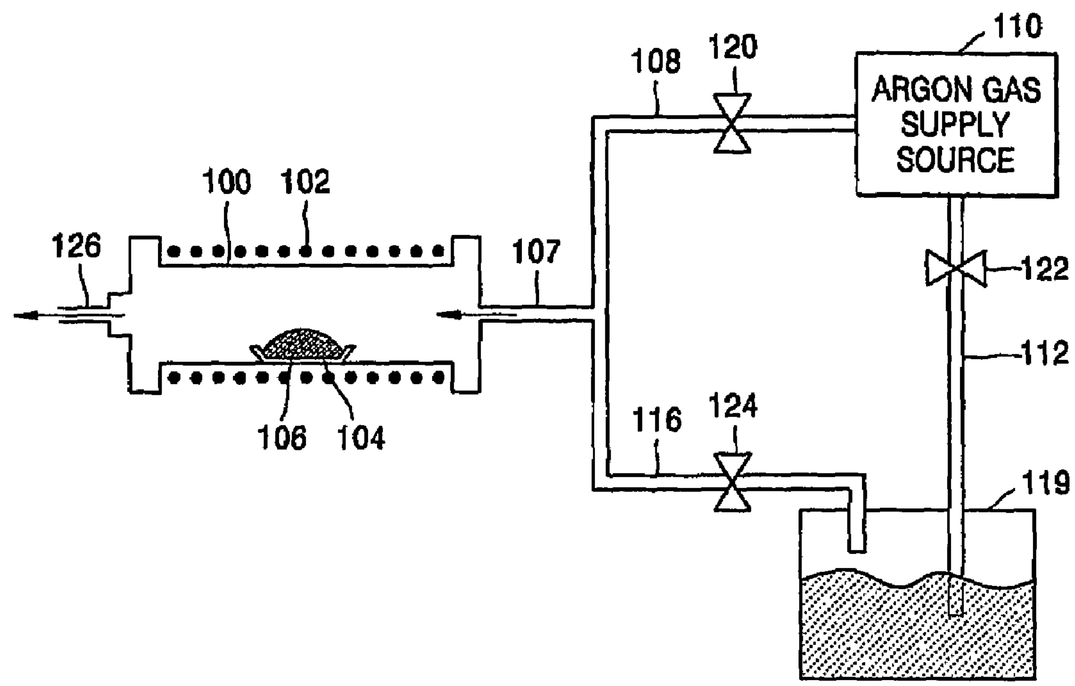
FIGS. 1 and 2 are schematic views of an apparatus of synthesizing carbon nanotubes, which is used in a method of synthesizing double-walled carbon nanotubes according to the present invention.
Figure 2:
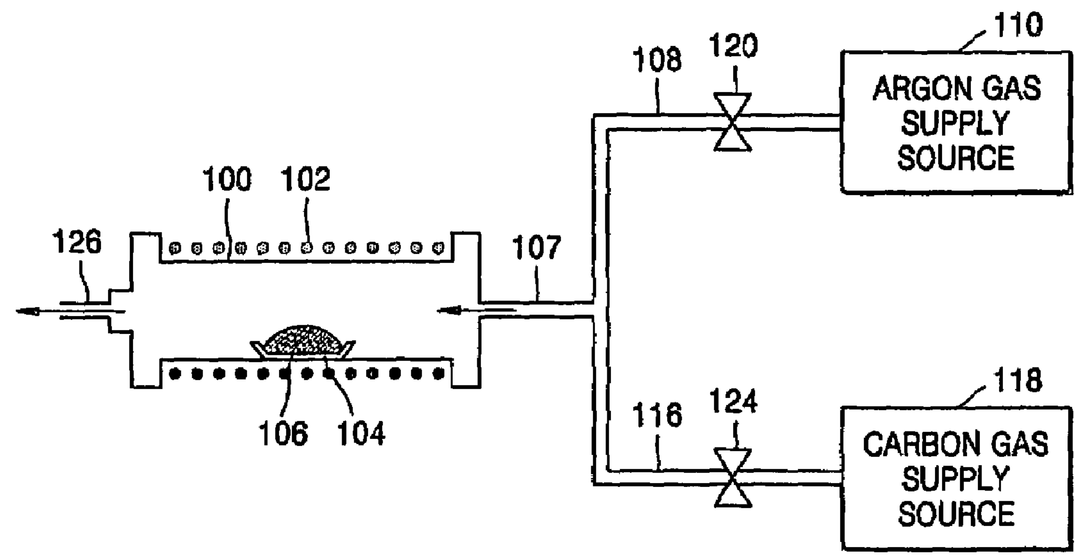

FIGS. 1 and 2 are schematic views of an apparatus of synthesizing double-walled carbon nanotubes using a method according to the present invention. The double-walled carbon nanotube is synthesized using a vapor phase synthesis method.

Referring to FIGS. 1 and 2, the apparatus includes a reactor 100, a heating coil disposed outside the reactor 100, for heating the reactor 100, and a boat 104 disposed inside the reactor 100. The boat 104 is a quartz boat or a graphite boat. A catalyst material where double-walled nanotubes are being grown is loaded in the boat 104. The catalyst material 106 is a powder support material containing catalyst metal particles.

The reactor 100 has a gas inlet 107 connected to an argon (Ar) gas supply source 110 through a first gas supply pipe 108. The Ar gas supply source 110 shown in FIG. 1 is connected to a second gas supply pipe 112 for supplying Ar gas to an evaporator 119 containing a carbon source solution, for example, alcohol therein. The carbon source solution may be benzene, hexane, tetra hydrofuran (THF) or propanol.

The gas inlet 107 of the reactor 100 is connected to a third gas supply pipe 116 through carbon source gas is supplied. The carbon source gas is vaporized by supplying Ar gas through the second gas supply pipe 112 connected to the Ar gas supply source 110, and is then supplied to the reactor 100 through the third gas supply pipe 116.

In the synthesis apparatus shown in FIG. 2, the second gas supply pipe 112 is not connected to the Ar gas supply source 110 and a carbon gas supply source 118 is connected directly to the third gas supply pipe 116. Accordingly, the synthesis apparatus is supplied carbon source gas through the third gas supply pipe 116 connected to the carbon gas supply source 118.

The carbon source gas supplied from the carbon gas supply source 118 is, for example, acetylene, methane, ethylene, propane, CO or the like. Both the supply methods of carbon gas shown in FIGS. 1 and 2 can be used and do not cause any trouble in synthesizing the double-walled carbon nanotubes of the present invention.

A first valve 120, a second valve 122 and a third valve 124 are installed on the first gas supply pipe 108, the second gas supply pipe 112 and the third gas supply pipe 116, respectively so as to block the gas supply to the reactor 100. The gases introduced through the inlet 107 of the reactor 100 are moved in a direction indicated by an arrow and is then exhausted through a gas outlet 126.

In the synthesis apparatus of the double-walled carbon nanotubes using the vapor phase synthesis method, carbon source gas is supplied through the evaporator 119 while the reactor is kept in a contact temperature, or carbon source gas is supplied to the reactor 100, and then the double-walled carbon nanotubes are grown by the catalyst material 106 using the vapor phase synthesis method. When growing the double-walled carbon nanotubes, Ar gas is supplied through 110 if necessary.

Figure 3:
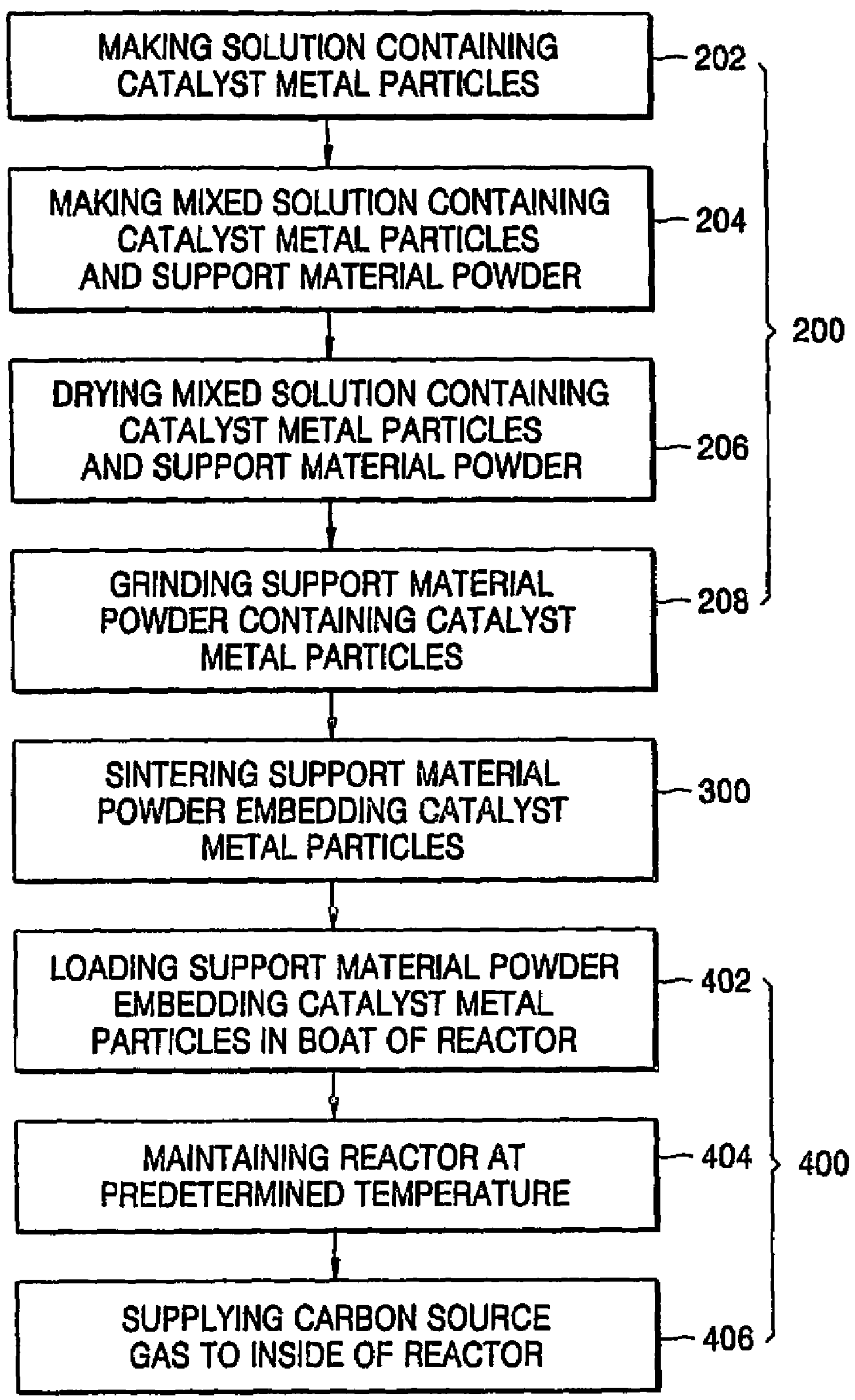
FIG. 3 is a flowchart illustrating a method of synthesizing double-walled carbon nanotubes according to the present invention.
Figure 4:
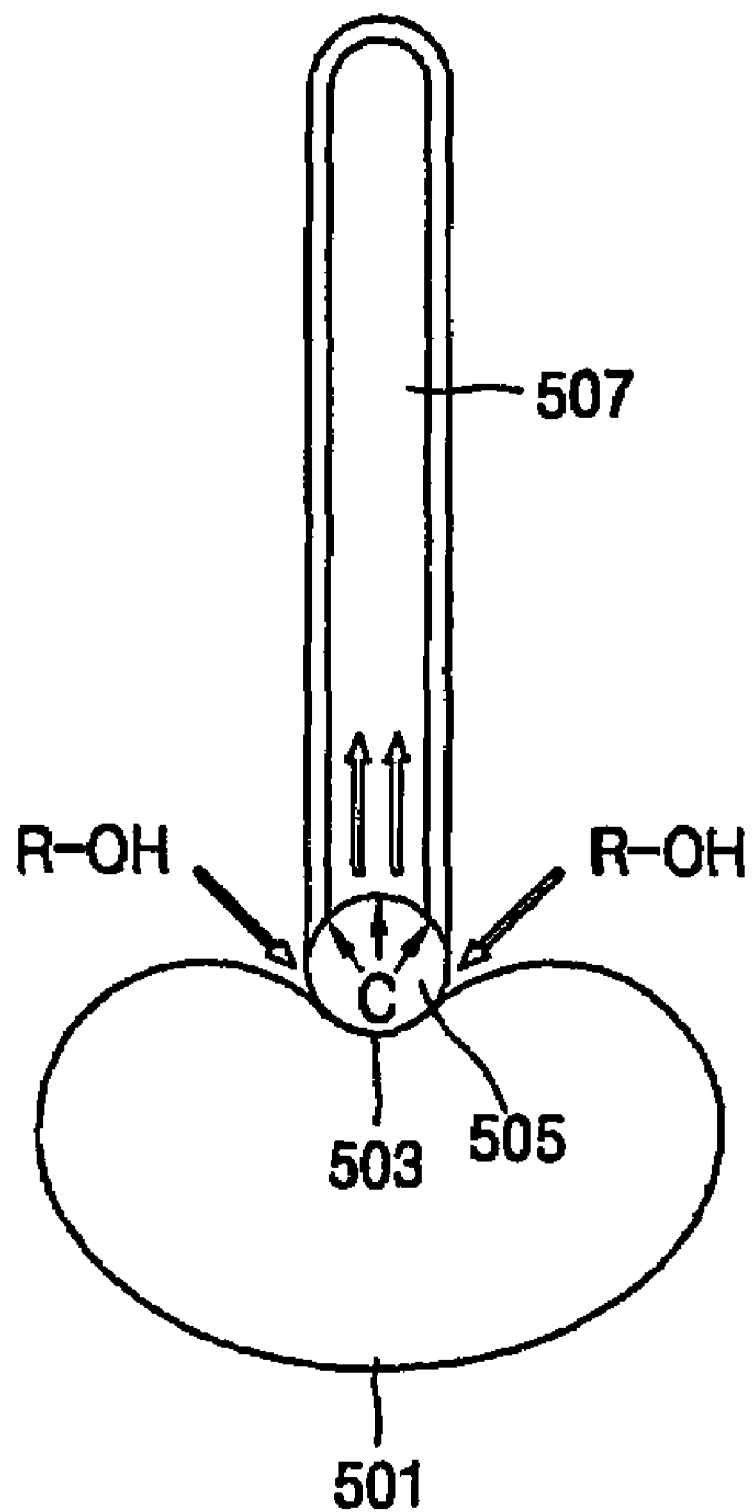
FIG. 4 is a schematic view illustrating a synthesis mechanism of double-walled carbon nanotubes according to the present invention.

FIG. 3 is a flowchart illustrating a method of synthesizing double-walled carbon nanotubes according to the present invention, and FIG. 4 is a schematic view illustrating a synthesis mechanism of double-walled carbon nanotubes according to the present invention.

Specifically, to synthesize the double-walled carbon nanotubes, it is essentially required to form catalyst metal particles having proper sizes and to supply proper carbon source gas necessary. To form the catalyst metal particles with proper sizes, it is necessary to select a support material having a size of a few nanometers and to adjust a concentration of the catalyst metal particles in a solution in which the catalyst metal particles are dissolved. Finally, the carbon source gas reacting with the catalyst metal particles should be properly supplied. At this time, a synthesis temperature acts as an important factor.

The method of synthesizing double-walled carbon nanotubes according to the present invention includes three operations. In the first operation (operation 200), catalyst metal particles composed of Fe, Co, Ni, Mo or an alloy of the aforementioned metal elements and having a size of 2-5 nm are embedded in nano pores of a support material in powder form composed of MgO, $Al_2O_3$, zeolite or silica.

The operation 200 will now be described in more detail.

First, a solution containing catalyst metal particles is fabricated. (Operation 202) The solution containing catalyst metal particles is, for example, $Fe(NO_3)_3.9H_2O$, $FeCl_2.9H_2O$, $CoSO_4.XH_2O$, $Co(NO_3)_2.6H_2O$, $Ni(NO_3)_2.6H_2O$, $NiSO_4.6H_2O$ or the like. A solution containing the catalyst metal particles composed of Mo is prepared by diluting $MoS_2$, $MoCl_2$ or the like in deionized water, or by diluting solid Mo in deionized water. Thus, the solution containing catalyst metal particles is made by mixing the aforementioned materials and then diluting the mixed materials in delonized water for 1 hour.

Next, the solution containing catalyst metal particles is mixed with the mixed solution of the deionized water and the support material (i.e., support material powder) in an ultrasonic apparatus for 1 hour, thereby fabricating a mixed solution (operation 204).

If the mixed solution containing the catalyst metal particles and the support material powder is a solution containing Fe, Ni or Co, Mo, and MgO, a molar ratio of Fe, Ni or Co:Mo:MgO is 0.7-1:0.1-0.3:10-13. If the mixed solution containing the catalyst metal particles and the support material powder is a solution containing Fe or Ni, Mo, and MgO, a molar ratio of Fe:Ni:Mo:MgO is 0.7-1:0.1-0.3:0.1-0.3:10-13. If the mixed solution containing the catalyst metal particles and the support material powder is a solution containing Fe or Co, Mo, and MgO, a molar ratio of Fe:Co:Mo:MgO is 0.7-1:0.1-0.3:0.1-0.3:10-13.

Next, the mixed solution containing the catalyst metal particles and the support material powder is unloaded from the ultrasonic apparatus and is then dried in a vacuum oven for 15 hours at a temperature of 150° C. to remove moisture (operation 206). Thereafter, to further miniaturize the support material powder, which moisture is removed from and contains the catalyst metal particles, the support material powder is ground and pulverized in a mortar, and the catalyst metal particles are embedded in the pores of the pulverized support material powder (operation 208).

Meanwhile, in the second operation of the synthesis method according to the present invention, the support material powder embedding the catalyst metal particles in the pores thereof is sintered (operation 300). Since the sintering increases the surface area of the support material powder, it is possible to increase density of the catalyst metal particles substantially participating in a reaction during the synthesis of the double-walled carbon nanotubes.

Due to the sintering of the support material powder embedding the catalyst metal particles, since the catalyst metal particles can be properly adjusted in a size of 2-5 nm and are activated, it is possible to greatly increase the yield of the carbon nanotubes when synthesizing the carbon nanotubes.

During the sintering, the support material powder embedding the catalyst metal particles is loaded in a furnace and is sintered in air atmosphere for 6-12 hours at a temperature of 700-900° C. The sintering temperature and time can be adjusted, and hydrogen or argon gas may be used as an atmosphere gas.

In the third operation of the synthesis method according to the present invention, as carbon source gas is supplied to the catalyst metal particles embedded on the support material, a catalyst reaction between the carbon source gas and the catalyst metal particles occurs, so that the double-walled nanotubes are formed (operation 400).

The forming of the double-walled carbon nanotubes will now be described in more detail with reference to FIGS. 1 through 4. First, the support material 106 embedding the catalyst metal particles is provided in the boat 104, and the boat 104 is loaded in the reactor 100 (operation 402).

Next, 1000 sccm of argon gas is supplied to the reactor 100 while maintaining the reactor 100 at a predetermined temperature, for example, at a temperature of 700-1100° C. (operation 404)

Next, when the synthesis apparatus of FIG. 1 is used, the supply of argon gas to the reactor 100 is stopped, and 1000 sccm of argon gas is supplied to the evaporator 119 for 10 minutes, thereby vaporizing carbon source solution, for example, alcohol, and vaporized carbon source gas is supplied through the third gas supply pipe 116. The flow rate of the argon gas supplied to the evaporator 119 can be adjusted according to a size of the reactor 100. In addition to alcohol, the carbon source solution may be benzene, hexane, tetra hydrofuran (THF), propanol or the like.

Meanwhile, when the synthesis apparatus of FIG. 2 is used, the supply of argon gas to the reactor 100 is stopped, and carbon source gas, for example, acetylene is supplied in a flow rate of 40 sccm through the third gas supply pipe 116 for 20 minutes. In addition to acetylene, the carbon source gas may be methane, propane, or CO. Accordingly, by the carbon source gas supplied to the reactor 100, a catalyst reaction occurs at the catalyst metal particles, so that the double-walled carbon nanotubes are synthesized (operation 406).

It is preferable that the reactor 100 is maintained at atmospheric state during the synthesis of the double-walled carbon nanotubes. After the synthesis of the double-walled carbon nanotubes is completed, the temperature of the reactor is gradually lowered while supplying argon gas in a flow rate of 500 sccm to the reactor 100.

In the synthesis of the double-walled carbon nanotubes, the flow rate of argon gas supplied to the evaporator 119 is properly adjusted, or the flow rate of carbon source gas directly supplied to the reactor 100 is properly adjusted. Accordingly, it is suppressed that excessive carbon elements are supplied on a surface of the catalyst metal particles, amorphous carbon material adsorbed on the surface of the catalyst metal particles is removed, or it is suppressed that amorphous carbon clod or carbon particle is attached on an outer wall of the growing carbon nanotubes.

The synthesis (growth) mechanism of the double-walled carbon nanotubes on the catalyst metal particles will now be described in more detail with reference to FIGS. 1, 2 and 4.

The catalyst metal particles 505 are embedded in and fixed to nano pores 503 of the support material powder 501. When carbon source gas (ex. R—OH where R represents hydrocarbon) is supplied to the reactor 100 into which the support material powder embedding the catalyst metal particles in the nano cores 503 thereof is loaded, the supplied carbon source gas is pyrolysized in vapor phase, thereby forming carbon units (C═C or C) and free hydrogen ($H_2$). Also, after the carbon units are adsorbed on surfaces of the catalyst metal particles 505, they are diffused inwardly and dissolved. As the carbon units diffused into an inside of the catalyst metal particles 505 are accumulated, double-walled carbon nanotube starts to grow. If the carbon units are continuously supplied, the double-walled carbon nanotube 507 continues to grow from the catalyst metal particles by a catalyst action (reaction).

Since the catalyst metal particles 505 are embedded in and fixed to the nano pores 503 of the support material powder 501, movement of the catalyst metal particles 505 is suppressed even in a high temperature required for the synthesis of the carbon nanotubes, and accordingly it becomes possible to synthesize the double-walled carbon nanotubes having a uniform diameter.

Also, since the carbon nanotubes are synthesized on the catalyst metal particles supported in and fixed to the nano pores in an optimum carbon source supply condition, amorphous carbon clods are not formed and a high purity carbon nanotubes can be formed. Hence, the invention does not need a filtering operation after the synthesis of the carbon nanotubes.

Figures 5, 6, 7:
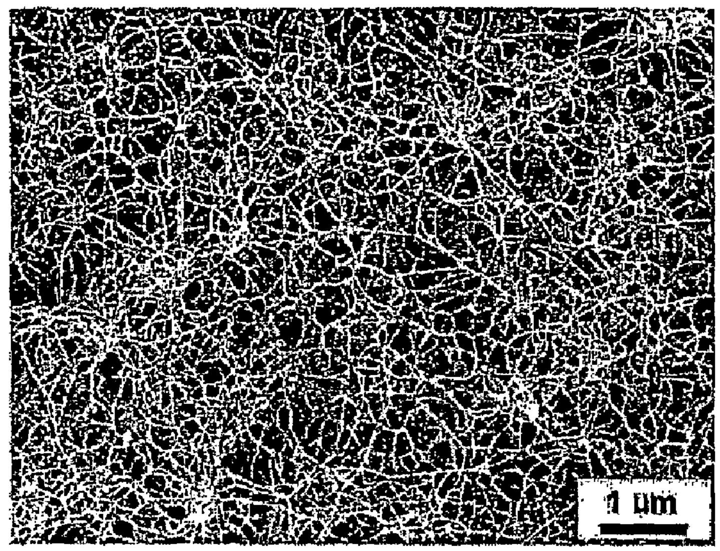
FIG. 5 is a SEM photograph of double-walled carbon nanotubes formed by the method of the present invention.
FIGS. 6 and 7 are TEM photographs of double-walled carbon nanotubes formed by the method of the present invention.

FIG. 5 is a SEM photograph of double-walled carbon nanotubes formed by the method of the present invention, and FIGS. 6 and 7 are TEM photographs of double-walled carbon nanotubes formed by the method of the present invention.

Specifically, the carbon nanotubes shown in FIG. 5 are samples not subjected to a filtering operation. As shown in FIG. 5, it is understood that massive carbon tubes are synthesized without defects such as amorphous carbon clods. Also, the carbon nanotubes shown in FIG. 5 have a diameter of 20-40 nm. In addition, the TEM photographs of FIGS. 5 and 6 show that the double-walled carbon nanotubes are formed.

As described above, according to the present invention, since the catalyst metal particles are embedded in and fixed to nano pores of the support material powder, movement of the catalyst metal particles is suppressed even in a high temperature, it becomes possible to synthesize double-walled carbon nanotubes having a uniform diameter.

Also, the present invention makes it possible to properly control the size of the catalyst metal particles at 2-5 nm and to activate the catalyst metal particles. Accordingly, since amorphous carbon clods are not formed, high purity carbon nanotubes can be formed and production yield of the carbon nanotubes can be enhanced.

Further, since amorphous carbon clods are not formed, the synthesis method of the present invention does not need a filtering operation after the synthesis of the carbon nanotubes. Furthermore, high purity double-walled carbon nanotubes can be synthesized massively by a simple method without using a complicated apparatus or a subsequent filtering operation.

INDUSTRIAL APPLICABILITY

The method of synthesizing the double-walled carbon nanotube according to the present invention can be employed, for example, in an electron emission device, an electronic device, a sensor, a high strength composite material, and the like.

What is claimed is:

1. A method of synthesizing double-walled carbon nanotubes, the method comprising:

embedding catalyst metal particles composed of Fe, Co, Ni, Mo or an alloy of the elements and having a size of 2-5 nm in nano pores of a support material powder composed of MgO, $Al_2O_3$, zeolite or silica;

sintering the support material powder in which the catalyst metal particles are embedded; and forming the double-walled carbon nanotubes by supplying a carbon source gas to the catalyst metal particles embedded in the support material powder and reacting the carbon source gas with the catalyst metal particles.

2. The method of claim 1, wherein the embedding the catalyst metal particles in the nano pores of the support material powder comprises:

making a first solution including the catalyst metal particles;

mixing the first solution with the support material powder to form a second solution;

removing moisture included in the second solution; and pulverizing the support material powder including the catalyst metal particles to form the support material powder in which the catalyst metal particles are supported.

3. The method of claim 2, wherein the removing the moisture is performed by a vacuum oven for 15 hours at a temperature of 150° C.

4. The method of claim 2, wherein if the second solution is a solution containing Fe, Ni or Co, Mo, and MgO, a molar ratio of Fe, Ni or Co:Mo:MgO is 0.7-1:0.1-0.3:10-13, if the second solution is a solution containing Fe or Ni, Mo, and MgO, a molar ratio of Fe:Ni:Mo:MgO is 0.7-1:0.1-0.3:0.1-0.3:10-13, and if the second solution is a solution containing Fe or Co, Mo, and MgO, a molar ratio of Fe:Co:Mo:MgO is 0.7-1:0.1-0.3:0.1-0.3:10-13.

5. The method of claim 1, wherein the sintering is performed in air atmosphere for 6-12 hours at a temperature of 700-900° C.

6. The method of claim 1, wherein the forming the double-walled carbon nanotubes comprises:

loading the support material powder embedding the catalyst metal particles in a reactor;

maintaining the temperature of the reactor including the support material powder at 700-1100° C.; and supplying a carbon source solution selected from the group consisting of alcohol, benzene, hexane, THF (tetra hydrofuran) and propanol, to an inside of the reactor in a gas form using an evaporator.

7. The method of claim 1, wherein the forming the double-walled carbon nanotubes comprises:

loading the support material powder embedding the catalyst metal particles in a reactor;

maintaining the temperature of the reactor including the support material powder at 700-1100° C.; and supplying a carbon source gas selected from the group consisting of acetylene, methane, ethylene, propane and CO to an inside of the reactor.

* * * * *

UNITED STATES PATENT AND TRADEMARK OFFICE

CERTIFICATE OF CORRECTION

PATENT NO. : 7,531,158 B2
APPLICATION NO. : 10/550500
DATED : May 12, 2009
INVENTOR(S) : Cheol Jin Lee It is certified that error appears in the above-identified patent and that said Letters Patent is hereby corrected as shown below:

At column 7, line 2, replace the trailing "." with --,--.

At column 7, line 3, delete "2. The method of claim 1,".

At column 7, line 14, replace "3. The method of claim 2" with --2. The method of claim 1--.

At column 7, line 17, replace "4. The method of claim 2" with --3. The method of claim 1--.

At column 8, line 1, replace "5. The method of claim 1" with --4. The method of claim 1--.

At column 8, line 4, replace "6. The method of claim 1" with --5. The method of claim 1--.

At column 8, line 14, replace "7. The method of claim 1" with --6. The method of claim 1--.

Signed and Sealed this
Twenty-eighth Day of June, 2011

David J. Kappos
*Director of the United States Patent and Trademark Office*